June 2, 1970  H. W. RAUHUT  3,515,612
METHOD OF MAKING FOAM SANDWICH
Filed March 24, 1967
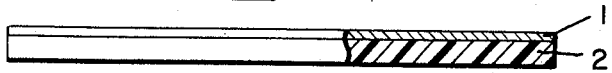
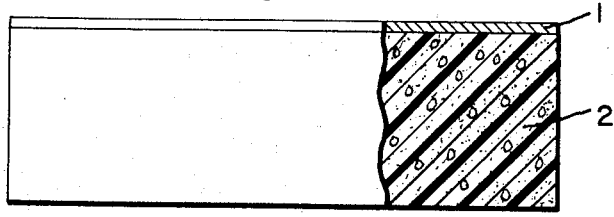
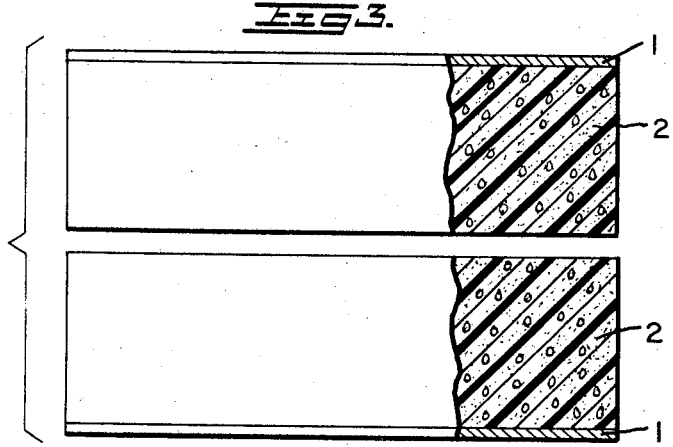
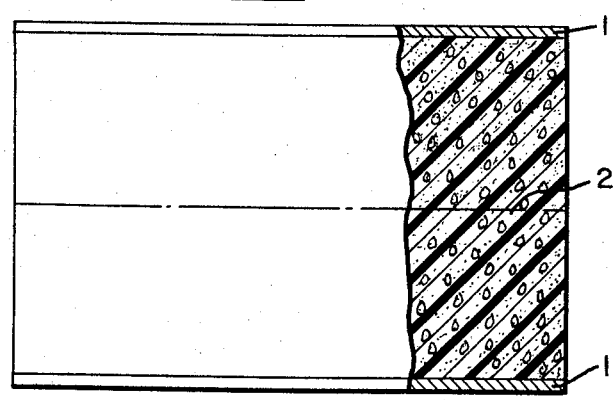
INVENTOR
HORST W. RAUHUT
ATTORNEYS

United States Patent Office 3,515,612
Patented June 2, 1970

3,515,612
METHOD OF MAKING FOAM SANDWICH
Horst W. Rauhut, Rockville, Md., assignor to the United States of America as represented by the Secretary of the Army
Filed Mar. 24, 1967, Ser. No. 626,368
Int. Cl. B32b 3/26, 27/40, 5/18
U.S. Cl. 156—79       4 Claims

ABSTRACT OF THE DISCLOSURE

A low dielectric loss foam sandwich structure useful in delay lines made by coating two substrate sheets with a resinous mixture containing 10–70 parts of an ethylene-propylene terpolymer, 30–90 parts of a styrene monomer or an inert volatile solvent, 1–2 parts of a free radical polymerization initiator and 1–5 parts of a blowing agent; heating the coated substrate sheets at 60–80° C. to foam the resinous mixture; placing the resultant foamed surfaces face to face in the form of a sandwich; and heating the sandwich at 70–90° C. to complete polymerization and vulcanization of the foamed resinous mixture.

---

The invention described herein may be used by or for the Government of the United States for governmental purposes without the payment to me of any royalties thereon.

This invention relates to a method for making a low dielectric loss foam sandwich structure and to the resultant structure. Low dielectric loss foam sandwich structures are particularly suited for use in delay lines, and in microwave striplines, printed circuits and the like.

It is well known that resin systems based on styrene are relatively low in cost and produce foams exhibiting unusually low dielectric loses. However, foams made from such resins tend to be brittle and the resultant foam sandwich lacks the resiliency and toughness desirable to withstand rough handling and/or mechanical shock.

I have discovered a low-loss dielectric foam sandwich of improved resilience and toughness and a method for making such a sandwich. The foam in my novel sandwich structure, while it may contain styrene, is based on an ethylene-propylene terpolymer and the sandwich is made by the mutual adhesion of two foam coated substrates.

It is therefore, an object of the present invention to provide a resilient, low dielectric loss, foam sandwich structure.

It is a further object of the invention to provide a convenient method for the preparation of such foam sandwiches.

These and other desirable objects and advantages are obtained by the method of the present invention for making a foam sandwich which comprises coating two substrate sheets with a resinous mixture containing 10–70 parts of ethylene-propylene terpolymer, 30–90 parts of styrene monomer or an inert volatile solvent, 1–2 parts of a free radical polymerization initiator and 1–5 parts of a blowing agent; heating the coated substrate sheets at 60–80° C. to foam the resinous mixture; placing the resultant foam surfaces face to face in the form of a sandwich; and heating the sandwich at about 70–90° C. to complete polymerization and vulcanization of the foamed resin.

My invention will be more particularly described in the discussion which follows and by means of the embodiments thereof shown in the accompanying drawing wherein:

FIG. 1 is an end elevational view with a portion broken away of a substrate sheet coated with a resinous mixture;

FIG. 2 is a view similar to that of FIG. 1 after the resinous mixture has been foamed;

FIG. 3 is a similar view wherein two of the foam coated substrates shown in FIG. 2 are being placed foam face to foam face to form a sandwich structure; and FIG. 4 is a view similar to that of FIG. 3 after the foamed resin core of the sandwich structure has been cured.

The ethylene-propylene terpolymer employed in the foam sandwich of my invention may be any conventional unvulcanized ethylene-propylene terpolymer. Such terpolymers usually contain about 35–66 mole percent of ethylene, about 34–55 mole percent of propylene and about 1–10% by weight of a non-conjugated diene such as 5-methylene-2-norbornene, dicyclopentadiene, 1,4-hexadiene and the like. Terpolymers of this type are conventionally vulcanized at temperatures between 130–180° C. and up to 205° C.

Since styrene itself is relatively slow curing, a faster curing styrene-type system containing styrene and/or one or more more reactive substituted styrenes such as dichlorostyrene, divinylbenzene and the like may be employed in the present process in order to accelerate the curing reaction. The term styrene monomer as used herein refers to styrene, substituted styrenes and/or mixtures thereof.

The styrene monomer, or any portion of it, may be replaced by an inert solvent such as benzene or isooctane, unreactive under process conditions. The solvent should be volatile, i.e., have a boiling point or possess a high vapor pressure in the 60–90° C. temperature range utilized in the process of the present invention.

Various other optional additives may be included in the formulation in order to improve the resultant foamed product. Based on the amount of terpolymer used, up to 5% by weight of a nonionic or anionic surfactant or organo silicone cell-control agent may be added. Up to 5% by weight of a conventional anti-oxidant such as N,N'-di-$\beta$-napthyl-p-phenylendiamine, 4:4-thiobis-(6-tert-butyl-m-cresol), etc. may be added to inhibit thermal oxidation. A small amount of a bubble nucleating agent such as polythylene powder may be added to promote formation of a fine-sized foam cell structure.

The ethylene-propylene terpolymer is thoroughly mixed or blended with the styrene monomer, preferably in a cam style mixing unit. One to five parts by weight of a blowing agent or propellant is added to the resinous blend to effect foaming. The blowing agent, as is well known to those skilled in the art, may be a volatile liquid boiling at or below about 60–90° C., e.g., pentane or hexane, or more preferably a conventional solid glowing agent such as azodiisobutyronitrile decomposing at or below about 60–90° C. to liberate a gas such as nitrogen or carbon dioxide. A mixture of liquid and solid blowing agents may be utilized.

Polymerization of the styrene monomers and vulcanization of the ethylene-propylene terpolymer is initiated by means of a free radical-producing catalyst effective at 60–90° C. Preferred polymerization catalysts are organic peroxides such as benzoyl peroxide and methyl ethyl ketone peroxide, and organic hydroperoxides such as cumene hydroperoxide and butyl hydroperoxide, and more particularly peroxyesters such as t-butylperoctoate. The catalyst and the blowing agent are intimately mixed with the resinous blend preferably just prior to use.

The preparation of a foam sandwich according to the method of my invention is more particularly illustrated by means of the drawing. FIG. 1 shows the resinous mixture 2 coated onto a substrate sheet 1 which may be fabricated of plastic or a metal such as copper or aluminum. While coating may be accomplished by any conventional means, coatings of the desired thickness are more readily achieved when the resin is applied to the substrate by means of a roller. The substrate sheet is preferably given a surface treatment or degreased prior to coating in order to promote adhesion of the coating.

The resin coated substrate sheet is heated for up to two hours at 70–80° C. The heat treatment converts the resinous mixture 2 to a tacky foam coating on the substrate 1 as shown in FIG. 2. Two of the foam coated substrates shown in FIG. 2 are placed foam face to foam face while still tacky to form a sandwich structure as shown in FIG. 3. Further heating at 80–90° C., usually for about two hours under light pressure, effects polymerization and vulcanization of the foamed resin system and firmly adheres both halves of the sandwich to each other.

Using this method, a resinous mixture comprising thirty-three parts of ethylene-propylene 1,4-hexadiene terpolymer (Nordel 1040) and sixty-seven parts of benzene was prepared using a cam style mixing unit. Five parts of azodiisobutyronitrile and about two parts of t-butyl-peroctoate were added. A portion of this mixture was used at 70° C. to prepare a one inch foam layer one-tenth inch thick between a pair of one ounce copper foils. The foam sandwich structure had a dielectric constant of 2.4 and a dielectric loss (tan delta) of $4 \times 10^{-4}$ at $10^5$ Hz.

A similar sandwich structure was prepared by foaming at 70° C. a mixture of 2 grams of the ethylene-propylene terplymer, 8 grams of styrene, 0.2 gram of azodiisobutyronitrile and 0.1 gram of t-butyl peroctoate. The dielectric constant of the foam core was 1.51 at $10^8$ Hz. Similar results were obtained using (Enjay 4504) another ethylene-propylene terpolymer.

It is evident that further changes and modifications may be made in the process described above without departing from the spirit and scope of the present invention. The invention is as decribed in the appended claims.

I claim:
1. A method for preparing a foam sandwich which comprises coating two substrate sheets with a resinous mixture containing 10–70 parts of an ethylene-propylene terpolymer, 30–90 parts of a styrene monomer or an inert volatile solvent, 1–2 parts of a free radical polymerization initiator, and 1–5 parts of a blowing agent; heating the coated substrate sheets at 60–80° C. to foam the resinous mixture, placing the two foamed surfaces face to face in the form of a sandwich; and heating the sandwich at 70–90° C. to complete polymerization and vulcanization of the foamed resin.

2. A method according to claim 1 wherein the resinous mixture contains an anti-oxidant.

3. A method according to claim 1 wherein the resinous mixture contains 30–90 parts of a styrene monomer.

4. A method according to claim 1 wherein the resinous mixture contains 30–90 parts of an inert volatile solvent.

References Cited
UNITED STATES PATENTS

| | | | |
|---|---|---|---|
| 3,174,887 | 10/1959 | Voelker | 161—161 |
| 3,341,480 | 9/1967 | Feild | 260—2.5 |
| 3,415,714 | 12/1968 | Hider | 161—161 |

WILLIAM J. VAN BALEN, Primary Examiner

U.S. Cl. X.R.

156—182, 306; 161—160, 161, 216, 217